United States Patent [19]
Auborn

[11] 3,897,264
[45] July 29, 1975

[54] ELECTROCHEMICAL CELLS WITH INORGANIC OXYHALIDE OR THIOHALIDE SOLVENT

[75] Inventor: James J. Auborn, Groton, Mass.

[73] Assignee: GTE Laboratories Incorporated, Waltham, Mass.

[22] Filed: Nov. 28, 1973

[21] Appl. No.: 419,562

Related U.S. Application Data

[63] Continuation-in-part of Ser. No. 305,812, Nov. 13, 1972, abandoned.

[52] U.S. Cl. ............ 136/6 LN; 136/100 R; 136/155
[51] Int. Cl. .......................................... H01m 35/00
[58] Field of Search ........... 136/6 LN, 6 L, 100, 83, 136/154, 155

[56] References Cited
UNITED STATES PATENTS

| | | | |
|---|---|---|---|
| 3,423,242 | 1/1969 | Meyers et al. | 136/6 LN |
| 3,567,515 | 3/1971 | Maricle et al. | 136/6 LN |
| 3,573,105 | 3/1971 | Weininger et al. | 136/86 A |
| 3,578,500 | 5/1971 | Maricle et al. | 136/6 LN |

*Primary Examiner*—John H. Mack
*Assistant Examiner*—C. F. Lefevour
*Attorney, Agent, or Firm*—Irving M. Kriegsman

[57] ABSTRACT

Electrochemical cells having an oxidizable active anode material; a cathode material selected from the group consisting of halogens and metal halides; and an electrolytic solution between and in contact with the anode and the cathode, the electrolytic solution comprising a liquid covalent inorganic oxyhalide or thiohalide solvent selected from the group consisting of monofluorophosphoryl dichloride, monobromophosphoryl difluoride, dibromophosphoryl monofluoride, monofluorothiophosphoryl dichloride, thiophosphoryl chloride, monobromothiophosphoryl difluoride, dibromothiophosphoryl monofluoride, and mixtures thereof, and a solute dissolved therein.

21 Claims, No Drawings

ELECTROCHEMICAL CELLS WITH INORGANIC OXYHALIDE OR THIOHALIDE SOLVENT

REFERENCE TO PARENT APPLICATION

This application is a continuation-in-part application of application Ser. No. 305,812, filed Nov. 13, 1972 now abandoned.

BACKGROUND OF THE INVENTION

This invention relates to electrochemical cells. Most particularly, it relates to electrochemical cells having an oxidizable active anode material, a cathode material selected from halogens and metal halides, and an inorganic oxyhalide or thiohalide-based electrolytic solution between and in contact with the anode and cathode materials.

Modern technology has placed increased emphasis on producing an electrochemical power source having improved reliability, light weight, small size, high power and long life. Power sources meeting these requirements find ready civilian and military applications in protable communications systems, entertainment products, emergency lights, and portable electronic devices, such as wristwatches and hearing aids. An inexpensive, lightweight, high power, reliable power source would be of great value for use, for example, with portable radios or television sets.

Various high-voltage, high-energy density electrochemical cells have been the subject of recent investigation. Much of the work in this area has been involved with electrochemical cells having negative electrodes comprising highly reactive metals such as lithium.

Work on electrolytes for lithium-based electrochemical power sources has progressed generally along two major lines: high temperature, inorganic molten salt electrolytes and organic solvent-based electrolytes. A cell which utilizes a molten salt electrolyte provides a chemically stable system in which strong oxidants such as chlorine can be used as cathodes. For example, a molten salt cell utilizing a lithium anode and chlorine cathode provides exceptionally high energy and power density making development of a practical cell with these materials of particular interest. The moten salt lithium/chlorine cell (having a lithium anode, chlorine cathode and molten salt, typically lithium chloride, electrolyte) has many characteristics desirable in a high performance electrochemical cell. The anode is highly electropositive, and the cathode is highly electronegative. The equivalent weight of the reaction product is low and the anode, cathode and electrolyte conductivities are high. Nevertheless, these cells have severe problems. The temperature range of operation, which for the lithium chloride electrolyte is 450°C to 650°C, necessitates heating systems and insulation that increases cell cost, weight and complexity. To collect and store the chlorine evolved in rechargeable cells at these high temperatures, auxiliary systems are needed. In addition, there are few materials that can withstand, for extended periods of time, the attack of molten lithium, chlorine and molten lithium chloride at these temperatures; therefore, the operating lifetime of these cells is relatively short, typically 20 to 30 minutes. The measured and theoretical open circuit voltage of these high temperature cells is about 3.5 volts, although approximately 4 volts are theoretically obtainable at 25°C (at higher temperatures the potential is lower because of the energy charge in the overall cell reaction).

In parallel with the development of lithium cells with molten salt electrolytes, lithium cells with nonhydroxylic organic solvents have been developed. These cells have been called "organic electrolyte cells" although typically they employ electrolytes consisting of inorganic salts in organic solvents. Cells of this type have the advantage of being operable at room temperature; however, chlorine itself and other strong oxidants cannot be used as the cathode depolarizer with these solvents since the solvents are oxidized by chlorine. Therefore, cells of this type will not provide an energy density as high as a lithium/chlorine cell.

In application Ser. No. 342,233, filed Mar. 16, 1973, a continuation-in-part application of application Ser. No. 131,530, filed Apr. 5, 1971, now abandoned, there is described an electrochemical cell having an active anode material selected from a specified group of materials, including lithium, a halogen or metal halide cathode material, and an electrolyte containing phosphorus oxychloride as the solvent material and a solute, selected from a wide range of materials, dissolved in the phosphorus oxychloride.

The present invention is related to the invention described in the aforementioned application in that the same anodic, cathodic and solute materials can be utilized in the present invention; however, this invention relates to the use of such materials with different solvent materials.

SUMMARY OF THE INVENTION

This invention is directed to electrochemical cells having an oxidizable active anode material, a cathode material selected from the group consisting of halogens and metal halides, and an electrolytic solution between and in contact with the anode and the cathode, the electrolytic solution comprising a liquid covalent inorganic oxyhalide or thiohalide solvent selected from the group consisting of monofluorophosphoryl dichloride, monobromophosphoryl difluoride, dibromophosphoryl monofluoride, monofluorothiophosphoryl dichloride, thiophosphoryl chloride, monobromothiophosphoryl difluoride, dibromothiophosphoryl monofluoride, and mixtures thereof, and a solute dissolved therein.

The halides and the metal halides are the sole cathode materials in these cells. These cells do not contain other cathode depolarizers or oxidant materials, such as sulfur dioxide, which are not needed in the cells of this invention. In addition, it is believed that the inorganic oxyhalide or thiohalide solvent passivates the anode material, whereby the need to provide an additive or a further material to passivate the anode is obviated.

The anode is an oxidizable material and is preferably lithium metal. Other oxidizable anode materials contemplated for use in the cells of this invention include the other alkali metals, such as sodium, potassium, rubidium and cesium; the alkaline earth metals, such as beryllium, magnesium, calcium, strontium and barium; the Group III A metals, such as aluminum, gallium, indium, and thallium; the Group IV A metals, such as tin and lead; the Group V A metals, such as antimony and bismuth; the transition metals, such as scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold and mercury; and the rare earth metals, such as lanthanum, cerium, praseodymium, neodymium, samarium, europium, gadolinium, terbium, dysprosium, holmium, erbium, thulium, ytterbium, and lutetium. Such anode materials are satisfactory if they provide a potential vs. the halogen or metal halide cathode material in the covalent inorganic oxyhalide-based or thiohalide-based electrolytic solution (i.e., the anode is more electropositive than the cathode material utilized) and the anode can be oxidized thereby. The anode may be constructed of the oxidizable material in contact with a metal grid. The grid for a lithium anode, for example, may be made of nickel, nickel alloys (such as monel), stainless steel, silver or platinum.

Particular cathode materials suitable for use in the present invention are the halogens, such as chlorine, bromine, and iodine; and the metal halides, such as nickel chloride, nickel fluoride, cobalt chlorides and fluorides, zinc chloride, zinc fluoride, cadmium chloride, cadmium fluoride, mercury chloride, copper fluoride, copper chloride, silver chloride, silver fluorides, lead chloride, bismuth fluoride and the like. Of these particular materials, chlorine and copper fluoride are presently preferred.

The total cathode structure in the case of solid metal halide cathode materials may be formed by mixing the particular metal halide with a finely divided conductive material, such as carbon black or graphite fibers, or small metal particles, such as silver particles or nickel flake to render the mixture conductive. In addition, materials like polypropylene, polyethylene and polytetrafluoroethylene may be incorporated with the solid cathodic material to act as a binder for the total cathode structure.

As used throughout this specification and claims, when an electrochemical cell is designated to have a particular anode or cathode, or to have a particular anode or cathode material, that anode or cathode, or anode or cathode material, shall mean the electrochemically active component of the anode or cathode structure. Such a component may be in contact with, or form a part of, a suitable substrate which further defines the total anode or cathode structure.

As indicated above, the electrolytic solution comprises a liquid covalent inorganic oxyhalide solvent and a solute dissolved therein. Applicable solvent materials include monofluorophosphoryl dichloride, monobromophosphoryl difluoride, dibromophosphoryl monofluoride, monofluorothiophosphoryl dichloride, thiophosphoryl chloride, monobromothiophosphoryl difluoride, dibromothiophosphoryl monofluoride, and mixtures thereof.

It is preferred that the solvent be dried prior to use. This can be accomplished by boiling the solvent material with clean lithium shot for 12–24 hours at room temperature under an argon or dry nitrogen atmosphere, followed by distillation at atmospheric pressure. The distillate obtained is quite pure and contains less than 1 ppm moisture. It is also preferred that a dry solvent is used. The solvents can also be dried by other techniques known in the art. Since these solvents are, in the first embodiment of the invention, electrochemically reducible, but otherwise non-reactive, and the reaction products of such reduction are relatively non-reactive, cells can be constructed with a wide range of anode and cathode materials, particularly anode materials which themselves are highly reactive, such as, for example, lithium.

The typical solute provides at least one anion of the general formula $X^-$, $MX_4^-$, $M'X_6^-$, and $M''Cl_6^=$, where M is an element selected fromo the group consisting of aluminum and boron; M' is an element selected from the group consisting of phosphorus, arsenic, and antimony; M'' is an element selected from the group consisting of tin, zirconium and titanium; and X is a halogen. Examples of suitable solutes yielding anions $MX_4^-$ are: tetrachloroaluminates ($AlCl_4^-$), tetrabromoaluminates ($AlBr_4^-$), tetrachloroborates ($BCl_4^-$), and tetrafluoroborates ($BF_4^-$). Examples of solutes yielding anions $M'X_6^-$ are: hexafluorophosphates ($PF_6^-$), hexafluoroarsenates ($AsF_6^-$), hexafluoroantimonates ($SbF_6^-$) and hexachloroantimonates ($SbCl_6^-$). Examples of solutes yielding anions $M''Cl_6^=$ are: hexachlorostannates ($SnCl_6^=$), hexachlorozirconates ($ZrCl_6^=$) and hexachlorotitanates ($TiCl_6^=$). Solutes yielding a halogen anion, particularly chlorides $Cl^-$), bromides ($Br^-$), and iodides ($I^-$), and solutes providing one of the anions dichloroiodates ($ICl_2^-$), dichlorophosphates ($PO_2Cl_2^-$), perchlorates ($ClO_4^-$) and chlorosulfates ($SO_3Cl^-$) are also contemplated within the scope of this invention.

The solute also provides at least one cation. This cation may be of an alkali metal, such as lithium, sodium, potassium, cesium, and rubidium; and alkaline earth metal, such as magnesium, calcium, strontium, and barium; or a lanthanide rare earth element, such as lanthanum, terbium, neodymium, cerium, europium and samarium. Cations having the following general formula $R_4N^+$ where R is a radical selected from the group consisting of methyl, ethyl, propyl, isopropyl, butyl and isobutyl are also contemplated to be suitable for use in this invention. Examples of suitable cations are: tetramethylammonium $(CH_3)_4^+$, tetraethylammonium $(C_2H_5)_4N^+$, tetrapropylammonium $(C_3H_7)_4N^+$, and tetrabutylammonium $(C_4H_9)_4N^+$. These cations may be added as the tetraalkylammonium chloride, for example. Other cations contemplated within the scope of this invention are those resulting from solvent dissociation, such as $POCl_2^+$ in the case of a monofluorophosphoryl dichloride-based electrolytic solution, etc.

The solute for a particular cell can be chosen to yield a combination of any of the anions and cations listed above; however, the electrolyte must contain at least $10^{-3}$ moles per liter of cation and at least $10^{-3}$ moles per liter of anion. Preferably, at least $10^{-1}$ moles per liter of anion. Preferably, at least $10^{-1}$ moles per liter of cation and at least $10^{-1}$ moles per liter of anion are present. It is also preferred that a dried solute be used.

Solutes having lithium cations and large anions which are stable to oxidation and reduction are particularly desirable. The preferred solute compounds are: lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate, and lithium chlorosulfate. Other preferred compounds are Lewis acids, particularly aluminum chloride ($AlCl_3$), boron fluoride ($BF_3$), tin chloride ($SnCl_4$), antimony chloride ($SbCl_5$), antimony fluoride ($SbF_5$), titanium chloride ($TiCl_4$), aluminum bromide ($AlBr_3$), phosphorus fluoride ($PF_5$), phosphorus chloride ($PCl_5$), arsenic fluoride ($AsF_5$), arsenic chloride ($AsCl_5$), zinc chloride ($ZnCl_2$) and zirconium chloride ($ZrCl_4$), in conjunction with a metal halide such as lithium chloride. In addition, Lewis bases having the general formula $A_mB_n$ where A is an element selected from the group consisting of lithium, sodium, potassium, rubidium, cesium, magnesium, calcium, strontium, barium and the rare earths and B is an element selected from fluorine, chlorine, bromine, iodine and oxygen are also useful. Included in this latter category are cesium chloride, rubidium chloride, and barium chloride.

The required anion and cation may be formed as a result of a chemical reaction directly with the solvent. For example, the Lewis acid $AlCl_3$ will react with the solvent $PSCl_3$ to yield the anion $AlCl_4^-$. The anion and cation may also be formed as a result of the reaction of a Lewis acid with a Lewis base dissolved in the solvent. For example, lithium chloride, LiCl, a Lewis base, will react with $AlCl_3$ to form $LiAlCl_4$ which dissociates in part to solvated $Li^+$ and $AlCl_4^-$.

Although not required for all of the cells of this invention, a suitable separator can be employed to prevent the reaction of anode and cathode materials when no electrical current flows through the external circuit. A separator prevents the diffusion of cathode material to the anode. When the cathode material is soluble in the electrolyte, an ion selective separator which allows only a particular ion or group of ions to migrate between the anode and cathode may be used. Two major groups of ion selective separators are organic permselective membranes and inorganic zeolites. A particularly useful membrane which permits the flow of lithium ions is perfluorinated hydrocarbon (membrane) sulphonate. If the cathode material is not soluble in the electrolyte, or does not react spontaneously with the anode material, mechanical separators can be used. A wide variety of ceramic and plastic materials having small pore sizes are available. Examples of such materials include: alumina, beryllia, titania, porcelain, porous glass, fritted glass, nonwoven porous polytetrafluoroethylene and other fluorinated polymers, polypropylene and polyethylene.

As indicated above, electrochemical cells of this invention exclude sulfur dioxide and other oxidants as cathode depolarizer materials or as solvent or cosolvent materials. Thus, the present invention describes cells in which the oxyhalide or thiohalide solvent is utilized in the absence of other oxidants, such as sulfur dioxide; thus distinguishing this invention from the cells of Maricle et al, U.S. Pat. No. 3,567,515 and U.S. Pat. No. 3,578,500, all of which make use of sulfur dioxide as an oxidant material. Further, this invention describes the stability of lithium and the inorganic oxyhalide solvent in the absence of the passivating film on the lithium caused by the sulfur dioxide of Maricle et al, supra. It is now believed that the oxyhalide or thiohalide solvent passivates the anode material, whereby the need to provide a further material, such as the sulfur dioxide of Marcle et al, supra, to perform such a function is eliminated.

The present invention is also considered distinct from the cells described in French Pat. Nos. 1,000,044; 1,583,804; and 2,079,744, since the cells of this invention make use of solvents different from, and not suggested by those utilized in the aforementioned French patents.

DESCRIPTION OF THE SPECIFIC EMBODIMENTS

The following Examples are given to enable those skilled in the art to more clearly understand the practice and present invention. They should not be considered as a limitation of the scope of the invention but merely as being illustrative and representative thereof.

EXAMPLE I

Two square pieces of platinum metal, each measuring 1 X 1 cm with appropriate metal leads attached at the center of each square served as the anode and cathode electrodes. The electrodes were placed in a glass container 1 centimeter apart with the leads extending outside the container.

An electrolytic solution comprising an 0.1 M solution of lithium tetrachloroaluminate ($LiAlCl_4$) in thiophosphoryl chloride was prepared by adding 0.351 grams of dry $LiAlCl_4$ to 20 cc of $PSCl_3$.

The electrolytic solution was poured into the container with the platinum electrodes. The cell was charged at 6 volts d. c. and 9 ma. for 45 minutes causing lithium metal to plate out on one electrode and chloride gas to evolve and surround the other electrode. The cell had an open circuit potential of about 4 volts.

EXAMPLE II

Example I is repeated except monobromophosphoryl difluoride is used as the solvent for the electrolytic solution.

EXAMPLE III

Example I is repeated except monofluorophosphoryl dichloride is used as the solvent for the electrolytic solution.

EXAMPLE IV

Example I is repeated except dibromophosphoryl monofluoride is used as the solvent the electrolytic solution.

EXAMPLE V

Example I is repeated except monofluorothiophosphoryl dichloride is used as the solvent for the electrolytic solution.

EXAMPLE VI

Example I is repeated except monobromothiophosphoryl difluoride is used as the solvent for the electrolytic solution.

EXAMPLE VII

Example I is repeated except dibromothiophosphoryl monofluoride is used as the solvent for the electrolytic solution.

EXAMPLE VIII

A pressed cupric chloride cathode comprising 70% cupric chloride, 10% graphite powder and 20% Teflon on a nickel screen is operated against a lithium anode in the electrolytic solution of Example I. The cell exhibits an open circuit potential of about 3 volts.

EXAMPLE IX

A pressed silver chloride cathode comprised of 40% silver chloride, 40% silver powder and 20% Teflon on a silver screen is operated against a lithium anode in a saturated solution of lithium tetrachloroborate in a mixture of monofluorophosphoryl dichloride with an equal volume of thiophosphoryl chloride. The cell exhibits an open circuit potential of about 3 volts.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material, or composition of matter, process, process step or steps, or then-present objective to the spirit of this invention without departing from its essential teachings.

What is claimed is:

1. An electrochemical cell consisting essentially of an oxidizable active anode material; an active cathode material selected from the group consisting of halogens and metal halides; said active cathode material being the sole oxidant material in said cells; and an electrolytic solution between and in contact with said anode and cathode materials, said electrolytic solution consisting essentially of an inorganic solvent material and a solute dissolved therein, said inorganic solvent material selected from the group consisting of monofluorophosphoryl dichloride, monobromophosphoryl difluoride, dibromophosphoryl monofluoride, monofluorothiophosphoryl dichloride, thiophosphoryl chloride, monobromothiophosphoryl difluoride, dibromothiophosphoryl monofluoride, and mixtures thereof.

2. The electrochemical cell of claim 1 wherein said anode material is lithium.

3. The electrochemical celll of claim 1 wherein said anode material is sodium.

4. The electrochemical cell of claim 1 wherein said active cathode material is a halogen.

5. The electrochemical cell of claim 1 wherein said active cathode material is chlorine.

6. The electrochemical cell of claim 1 wherein said active cathode material is a metal halide.

7. The electrochemical cell of claim 1 wherein said solute provides at least one anion having the formula $X^-$, $MX_4^-$, $M'X_6^-$, and $M''Cl_6^=$ where M is an element selected from the group consisting of aluminum and boron; M' is an element selected from the group consisting of phosphorus, arsenic and antimony; M'' is an element selected from the group consisting of tin, zirconium and titanium; and X is a halogen; said solute further providing at least one cation selected from the group consisting of alkali metals, the alkaline earth metals, the lanthanides, and $R_4n^+$, where R is a radical selected from the group consisting of methyl, ethyl, propyl, isopropyl, butyl and isobutyl.

8. The electrochemical cell of claim 1 wherein said solute includes at least one compound selected from the group consisting of lithium perchlorate, lithium dichlorophosphate, lithium chloride, lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate, and lithium chlorosulfate.

9. The electrochemical cell of claim 1 wherein said solute includes a Lewis acid.

10. The electrochemical cell of claim 1 wherein said inorganic solvent material is monobromophosphoryl difluoride.

11. The electrochemical cell of claim 1 wherein said inorganic solvent material is dibromophosphoryl monofluoride.

12. The electrochemical cell of claim 1 wherein said inorganic solvent material is thiophosphoryl chloride.

13. The electrochemical cell of claim 1 wherein said inorganic solvent material is monofluorophosphoryl dichloride.

14. The electrochemical cell of claim 1 wherein said inorganic solvent material is monofluorothiophosphoryl dichloride.

15. The electrochemical cell of claim 1 wherein said inorganic solvent material is monobromothiophosphoryl difluoride.

16. The electrochemical cell of claim 1 wherein said inorganic solvent material is dibromothiophosphoryl monofluoride.

17. The electrochemical cell of claim 1 wherein said inorganic solvent material comprises a mixture of at least two of said solvent materials.

18. The electrochemical cell of claim 1 wherein said cathode material is cupric chloride.

19. The electrochemical cell of claim 1 wherein said cathode material is silver chloride.

20. The electrochemical cell of claim 1 wherein said cell excludes sulfur dioxide.

21. An electrochemical cell consisting of an oxidizable active anode material; an active cathode material selected from the group consisting of halogens and metal halides; and an electrolytic solution between and in contact with said anode and cathode materials, said electrolytic solution consisting of an inorganic solvent material and a solute dissolved therein, said inorganic solvent material selected from the group consisting of monofluorophosphoryl dichloride, monobromophosphoryl difluoride, dibromophosphoryl monofluoride, monofluorothiophosphoryl dichloride, thiophosphoryl chloride, monobromothiophosphoryl difluoride, dibromothiophosphoryl monofluoride, and mixtures thereof.

* * * * *

PO-1050
(5/69)

UNITED STATES PATENT OFFICE
CERTIFICATE OF CORRECTION

Patent No. 3,897,264      Dated July 29, 1975

Inventor(s) James J. Auborn

It is certified that error appears in the above-identified patent and that said Letters Patent are hereby corrected as shown below:

Col. 1, line 22, change "protable" to --portable--.
Col. 4, line 3, change "fromo" to --from--.
Col. 4, lines 48-49, delete "Preferably, at least $10^{-1}$ moles per liter of anion."
Col. 5, line 27, change "elctrolyte" to --electrolyte--.
Col. 5, line 60, change "Marcle" to --Maricle--.
Col. 6, line 11, change "1 x 1 cm" to --1 cm x 1 cm--.
Col. 6, line 19, change "LIAlCl$_4$" to --LiAlCl$_4$--.
Col. 6, line 40, after "solvent" insert --for--.
Col. 7, claim 7, line 53, change "R$_4$n$^+$" to --R$_4$N$^+$--.
Col. 1, after the title insert the following paragraph:
--The invention herein described was made in the course of or under a contract or subcontract thereunder with the U.S. Government.--

Signed and Sealed this twenty-fourth Day of February 1976

[SEAL]

Attest:

RUTH C. MASON
Attesting Officer

C. MARSHALL DANN
Commissioner of Patents and Trademarks